J. W. CLARK.
Insect-Destroyer.
No. 56,711.
Patented July 31, 1866.
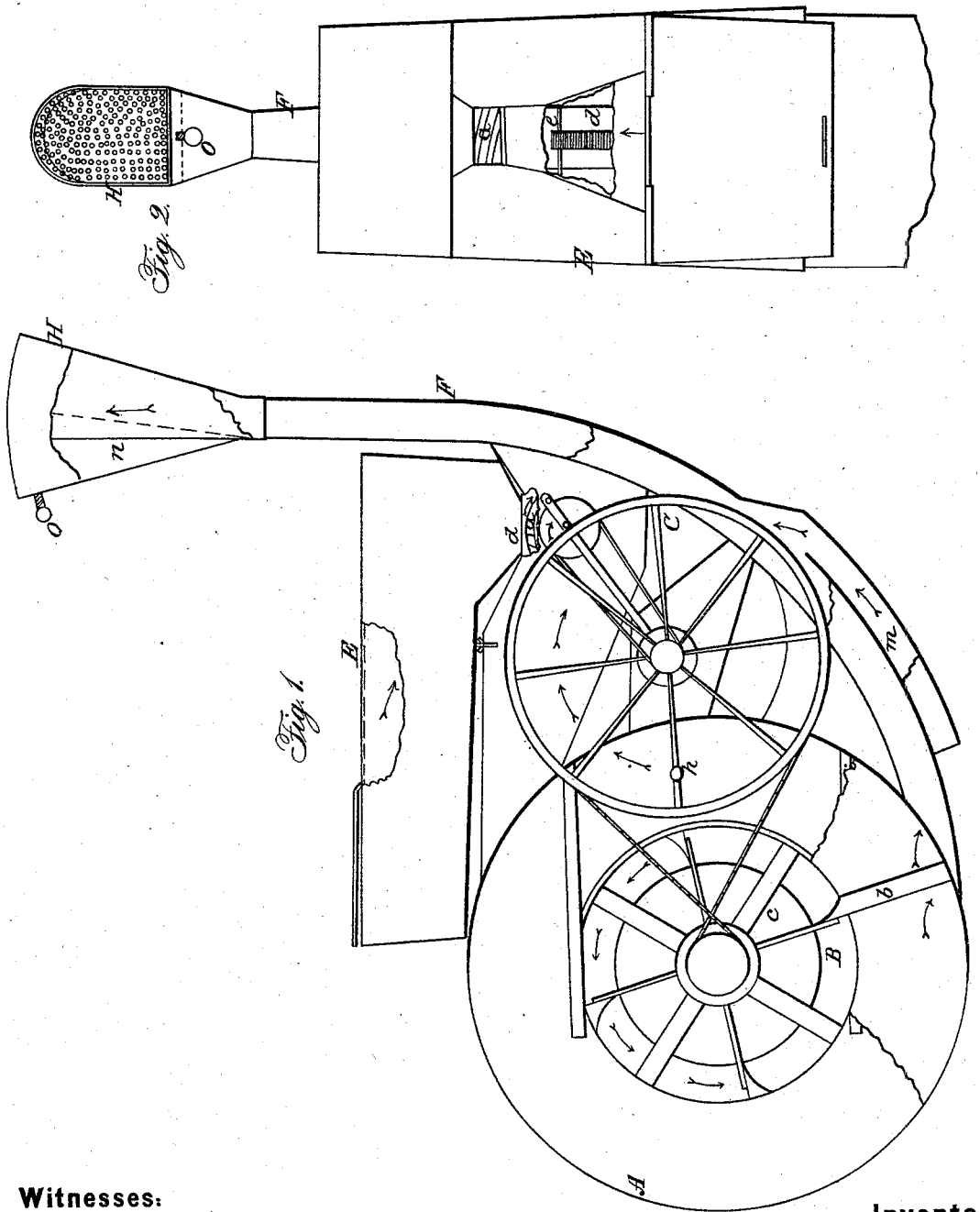
Witnesses:
Inventor:

UNITED STATES PATENT OFFICE.

J. W. CLARKE, OF KINGSTON, WISCONSIN.

IMPROVED SULPHUR-DUSTER.

Specification forming part of Letters Patent No. 56,711, dated July 31, 1866.

*To all whom it may concern:*

Be it known that I, JOHN W. CLARKE, of Kingston, in the county of Green Lake and State of Wisconsin, have invented certain new and useful Improvements in Sulphur-Dusters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1 is a side view, and Fig. 2 a top-plan view.

My invention consists in a novel construction of an implement for dusting plants with sulphur and similar substances by means of a current of air produced by a revolving fan.

I construct a fan-case, A, of the form shown in Fig. 1, and locate therein a fan, B, the central portion of the case A being left open for the admission of air, the opening being closed more or less by slides, to regulate the admission of the air, as in fanning-mills. The fan has its wings curved at each side, as represented by $b$, and a disk, $c$, is located at the center of the fan, concentric with its shaft, as shown in Fig. 1.

F represents a spout projecting forward and upward, and is provided at its end with an enlarged spout or head, H, having its end covered with a sheet of perforated metal or wire-gauze. Within this spout H a valve, $n$, is hinged and operated by a set-screw, $o$, as shown in Fig. 1, for decreasing or regulating its delivery. A secondary tube, $m$, is secured, as shown in Fig. 1, underneath the main tube F, its rear end being open for the admission of air, and communicating at its front end with the tube F, as shown, the course of the air being indicated by the arrows.

C represents the driving-wheel which transmits motion to the fan B, and also the small distributing or feed wheel $a$, located within the body of the machine, as shown in Fig. 1.

E represents a hopper for containing the sulphur, it being provided with a suitable cover, and having a passage or opening at its front end, directly over the feed-wheel $a$, and communicating with the spout F. A slide, $d$, is located directly over and in rear of the wheel $a$, and is operated by a pinion, $e$, as shown in Fig. 2, by which means the discharge of the sulphur into the spout can be regulated as desired.

It will, of course, be understood that either gearing or belts may be used for operating the apparatus.

Having thus described my invention, what I claim is—

1. The fan B, mounted in a suitable case, and arranged to operate in combination with the spout F, hopper E, and feed-wheel $a$, or their equivalents, substantially as shown and described.

2. In combination with the nozzle H, with its perforated cover, and the valve $n$, arranged and operating as set forth.

3. The auxiliary tube $m$, arranged to operate in connection with the spout F, as set forth.

J. W. CLARKE.

Witnesses:
T. B. FAIRCHILD,
N. SEELY.